(12) United States Patent
Dudrenov et al.

(10) Patent No.: US 12,033,600 B2
(45) Date of Patent: Jul. 9, 2024

(54) DISPLAYING IMAGE DATA BASED ON AMBIENT LIGHT

(71) Applicant: Apple Inc., Cupertino, CA (US)

(72) Inventors: Pavel V. Dudrenov, San Francisco, CA (US); Karol E. Czaradzki, Mountain View, CA (US); Felipe Bacim de Araujo e Silva, San Jose, CA (US); Edwin Iskandar, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/988,457

(22) Filed: Nov. 16, 2022

(65) Prior Publication Data
US 2023/0335079 A1    Oct. 19, 2023

Related U.S. Application Data

(63) Continuation of application No. 17/877,244, filed on Jul. 29, 2022, now abandoned.

(60) Provisional application No. 63/238,482, filed on Aug. 30, 2021.

(51) Int. Cl.
*G09G 5/10* (2006.01)

(52) U.S. Cl.
CPC ....... *G09G 5/10* (2013.01); *G09G 2320/0653* (2013.01); *G09G 2360/144* (2013.01)

(58) Field of Classification Search
CPC ............. G09G 5/10; G09G 2320/0653; G09G 2360/144
See application file for complete search history.

(56) References Cited

U.S. PATENT DOCUMENTS

| | | | |
|---|---|---|---|
| 9,576,398 B1* | 2/2017 | Zehner | G02B 27/017 |
| 10,127,728 B2* | 11/2018 | Osman | G06F 3/011 |
| 10,504,453 B1* | 12/2019 | Jung | G09G 3/3648 |
| 10,825,567 B1* | 11/2020 | Wala | G16H 10/60 |
| 11,079,753 B1* | 8/2021 | Roy | G05D 1/0088 |
| 2015/0288933 A1* | 10/2015 | Iversen | G06T 7/174 348/14.07 |
| 2016/0203305 A1* | 7/2016 | Suh | G06V 40/172 382/118 |
| 2016/0217621 A1* | 7/2016 | Raghoebardajal | H04N 13/366 |
| 2017/0091542 A1* | 3/2017 | Levy | G06T 7/20 |
| 2017/0178306 A1* | 6/2017 | Le Clerc | G06V 10/7715 |

(Continued)

*Primary Examiner* — Ibrahim A Khan
(74) *Attorney, Agent, or Firm* — Fernando & Partners, LLP

(57) ABSTRACT

Various implementations disclosed herein include devices, systems, and methods for displaying image data based on ambient light. In some implementations, a device includes an image sensor, an environmental sensor, a display, a non-transitory memory and one or more processors. In some implementations, a method includes capturing, via the image sensor, first image data that corresponds to a body part of a user of the device. In some implementations, the method includes detecting, via the environmental sensor, environmental data that indicates a current ambient light condition of a physical environment surrounding the device. In some implementations, the method includes generating second image data by modifying the first image data based on a function of the current ambient light condition and a threshold ambient light condition detected during enrollment. In some implementations, the method includes displaying the second image data on the display.

25 Claims, 4 Drawing Sheets

(56) References Cited

U.S. PATENT DOCUMENTS

| | | | |
|---|---|---|---|
| 2017/0243334 A1* | 8/2017 | Grossinger | G16B 45/00 |
| 2018/0075659 A1* | 3/2018 | Browy | G02B 27/017 |
| 2018/0101989 A1* | 4/2018 | Frueh | G06T 19/20 |
| 2018/0365875 A1* | 12/2018 | Yildiz | G06V 40/19 |
| 2019/0035356 A1* | 1/2019 | Wu | G09G 5/02 |
| 2019/0370533 A1* | 12/2019 | Han | G06V 40/171 |
| 2020/0193328 A1* | 6/2020 | Guestrin | G06T 7/194 |
| 2020/0245873 A1* | 8/2020 | Frank | A61B 5/0823 |

* cited by examiner

DISPLAYING IMAGE DATA BASED ON AMBIENT LIGHT

CROSS-REFERENCE TO RELATED APPLICATION

This application is a continuation application of and claims priority to U.S. patent application Ser. No. 17/877,244, filed on Jul. 29, 2022, which claims priority to U.S. provisional patent application No. 63/238,482, filed on Aug. 30, 2021, which are hereby incorporated by reference in their entirety.

TECHNICAL FIELD

The present disclosure generally relates to displaying image data based on ambient light.

BACKGROUND

Some devices include an image sensor that captures images and a display that displays the captured images. These images may depict various objects or people. These images may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
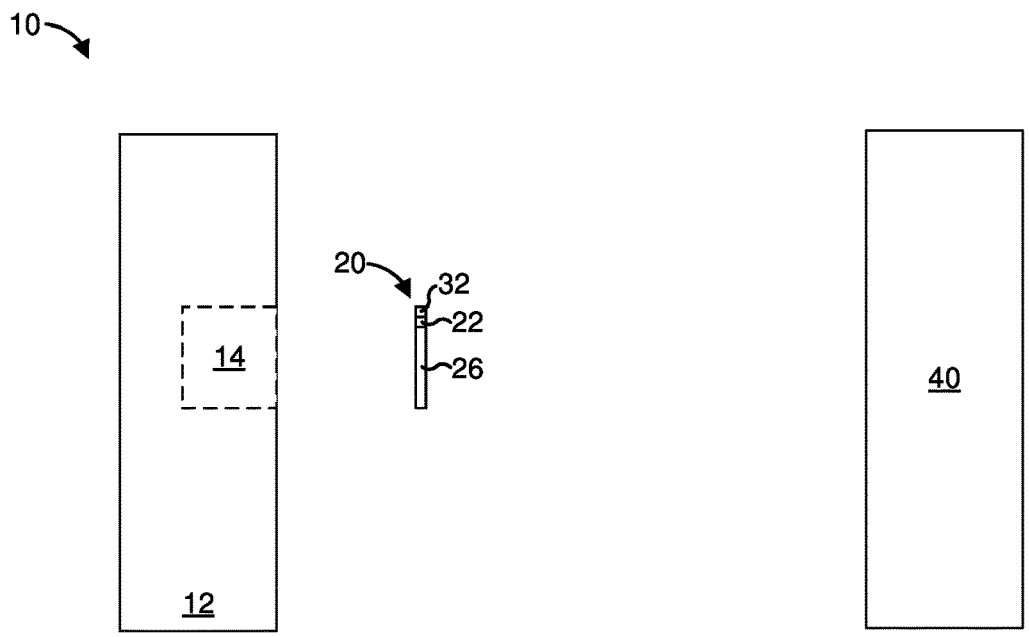
FIGS. 1A-1B are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying image data based on ambient light. In some implementations, a device includes an image sensor, an environmental sensor, a display, a non-transitory memory and one or more processors. In some implementations, a method includes capturing, via the image sensor, first image data that corresponds to a body part of a user of the device. In some implementations, the method includes detecting, via the environmental sensor, environmental data that indicates a current ambient light condition of a physical environment surrounding the device. In some implementations, the method includes generating second image data by modifying the first image data based on a function of the current ambient light condition and a threshold ambient light condition detected during enrollment. In some implementations, the method includes displaying the second image data on the display.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

A device may include a display that displays an image of a body part of a user of the device. Displaying the image of the body part allows another person that is located in a physical environment of the device to view a representation of the body part when the body part is obscured by the device. For example, if the device is a tablet or a smartphone with a display that is facing away from the user and that obscures a portion of a body part such as an arm of the user, the display displays an image of the obscured portion of the arm so that a person located in a physical environment of the device can view the image of the portion of the arm that is obscured by the device. A visual appearance of the body part may be affected by a display characteristic of the display. For example, a brightness of the portion of the arm being displayed on the display may be affected by a brightness level of the display. As such, there may be a mismatch between a visual appearance of the body part that the person is viewing via the display and a visual appearance of another body part that the person is viewing directly.

The present disclosure provides methods, systems, and/or devices for modifying image data corresponding to a body part based on a function of a current ambient light condition and a threshold ambient light condition detected during enrollment. A device captures image data that corresponds to a body part of a user of the device. The device generates modified image data by modifying the captured image data based on a difference between a current ambient light condition and a threshold ambient light condition detected during enrollment. The device displays the modified image data on a display of the device instead of the captured image data in order to provide an appearance that the body part is viewable through device. The device obtains enrollment image data that was captured prior to the image data being captured by the device, and the threshold ambient light condition corresponds to an ambient light condition when the enrollment image data was captured. Modifying the captured image data allows the device to match the visual appearance of the body part that the person is viewing via the display and the visual appearance of another body part that the person is viewing directly.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 20, a user 12 of the electronic device 20 and a person 40 facing the user 12. In some implementations, the electronic device 20 includes a handheld computing device that can be held by the user 12. For example, in some implementations, the electronic device 20 includes a smartphone, a tablet, a media player, a laptop, or the like. In some implementations, the electronic device 20 includes a wearable computing device that can be worn by the user 12. For example, in some implementations, the electronic device 20 includes a head-mountable device (HMD) or an electronic watch.

In some implementations, the electronic device 20 includes an image sensor 22 that is facing the user 12. As shown in FIG. 1A, the image sensor 22 captures images of a body part 14 of the user 12. For example, in some implementations, the electronic device 20 includes a tablet or a smartphone and the image sensor 22 includes a rear-facing camera that the user 12 points towards an arm of the user 12. In this example, the image sensor 22 captures images of the arm of the user 12.

In some implementations, the electronic device 20 includes a display 26. As can be seen in FIG. 1A, information displayed on the display 26 is visible to the person 40 when the display 26 is facing the person 40. In some implementations, the display 26 displays a modified version of images captured by the image sensor 22. Since the electronic device 20 obscures the body part 14 of the user 12 from the person 40, the display 26 allows the person 40 to view images of the body part 14 captured by the image sensor 22. Displaying images of the body part 14 on the display 26 provides an appearance that the body part 14 is not obscured.

In some implementations, the electronic device 20 is a tablet or a smartphone with a front-facing display and a rear-facing camera. In such implementations, the front-facing display displays images of a body part that is in a field-of-view of the rear-facing camera. For example, if an arm of the user 12 is in the field-of-view of the rear-facing camera, the front-facing display displays images of the arm captured by the rear-facing camera. In some examples, the user 12 points the rear-facing camera to his/her arm and overlays AR tattoos or stickers on the image of the arm. As such, the electronic device 20 allows the user 12 to see how a particular tattoo appears on the arm before having that particular tattoo painted on the arm. In some implementations, the electronic device 20 obscures another body part and displays an image of the other part on the display. Examples of other body parts include the chest, shoulders, legs, neck, head, eyes, nose, ears, and the like.

In some implementations, the electronic device 20 includes an environmental sensor such as an ambient light sensor (ALS) 32 that detects a current ambient light level of the physical environment 10. In some implementations, the electronic device 20 adjusts a display characteristic of the display 26 based on the current ambient light level detected by the ALS 32. For example, in some implementations, the electronic device 20 adjusts a brightness value and/or a color temperature of the display 26 based on the current ambient light level detected by the ALS 32.

As described herein, in some implementations, the electronic device 20 modifies the images captured by the image sensor 22 based on a difference between the current ambient light level detected by the ALS 32 and a threshold ambient light level detected during an enrollment phase. Modifying the images based on the current ambient light level and the threshold ambient light level provides an appearance that the person 40 is viewing the body part 14 directly instead of viewing images of the body part 14. For example, modifying images of the user 12 based on the current ambient light level and the threshold ambient light level provides an appearance that the person 40 is directly viewing the arm of the user 12 instead of viewing mere images of the arm of the user on the display 26. As such, the user 12 can keep wearing the electronic device 20 while conversing with the person 40 instead of having to dismount the electronic device 20 in order to converse with the person 40. Reducing the need to dismount the electronic device 20 during in-person interactions tends to enhance a user experience of the electronic device 20.

Figure 1B:
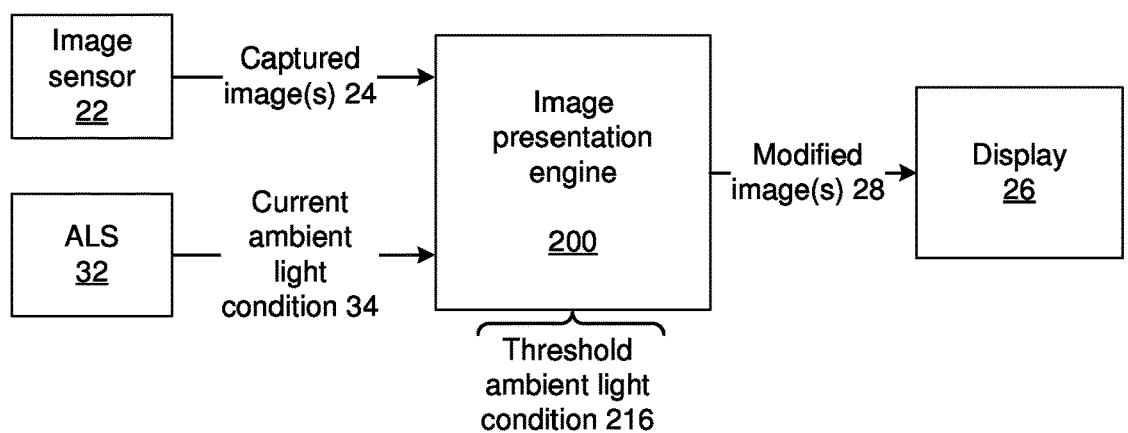

Referring to FIG. 1B, an image presentation engine 200 presents modified versions of images captured by the image sensor 22 on the display 26. In some implementations, the image presentation engine 200 resides at the electronic device 20. As shown in FIG. 1B, the image presentation engine 200 obtains an image 24 captured by the image sensor 22 ("captured image 24", hereinafter for the sake of brevity). The image presentation engine 200 obtains a current ambient lighting value indicative of a current ambient light condition 34 from the ALS 32. The image presentation engine 200 generates a modified image 28 by modifying the captured image 24 based on a difference between the current ambient light condition 34 and a threshold ambient light condition 216 that indicates an ambient light level when images of the body part 14 were captured during an enrollment phase. During the enrollment phase, images of the body part 14 can be captured by the electronic device 20 or by another device separate from the electronic device 20.

In some implementations, generating the modified image 28 includes adjusting a brightness of the captured image 24 based on the difference between the current ambient light condition 34 and the threshold ambient light condition 216 detected during enrollment. In some implementations, the image presentation engine 200 decreases a brightness of the captured image 24 if the current ambient light level is lower than the ambient light level detected during the enrollment phase. By contrast, in some implementations, the image presentation engine 200 increases a brightness of the captured image 24 if the current ambient light level is greater than the ambient light level detected during the enrollment phase. In some implementations, the display 26 includes an additive light display that utilizes local dimming to control the brightness of the modified image 28.

In some implementations, the captured image 24 does not include color information, however, enrollment images captured during the enrollment phase include color information. In such implementations, the image presentation engine 200 generates the modified image 28 by adding color information to the captured image 24. As such, while the captured images 24 may not indicate a color of the body part 14, the modified images 28 indicate the color of the body part 14.

Figure 2:
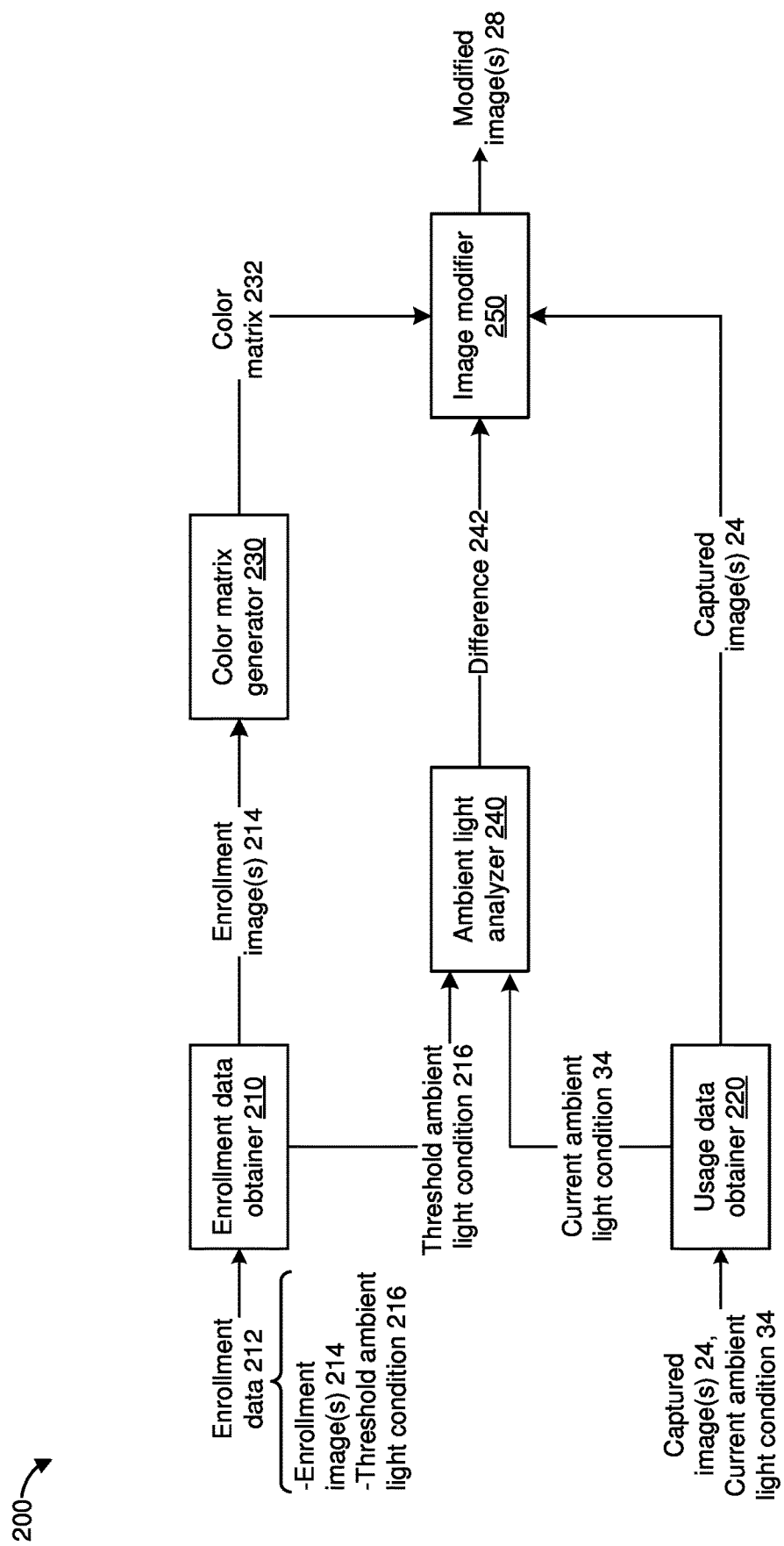
FIG. 2 is a block diagram of an image presentation engine in accordance with some implementations.

Referring to FIG. 2, in some implementations, the image presentation engine 200 includes an enrollment data obtainer 210, a usage data obtainer 220, a color matrix generator 230, an ambient light analyzer 240 and an image modifier 250. In various implementations, the enrollment data obtainer 210 obtains enrollment data 212 that was captured during an enrollment phase. In some implementations, the enrollment data 212 includes a set of one or more enrollment images 214 and an ambient lighting value that indicates a threshold ambient light condition 216 when the enrollment images 214 were captured. As an example, the enrollment image(s) 214 include images of the body part 14 shown in FIG. 1A. In some implementations, the enrollment data obtainer 210 provides the enrollment image(s) 214 to the color matrix generator 230, and the ambient light value indicating the threshold ambient light condition 216 to the ambient light analyzer 240.

In some implementations, the usage data obtainer 220 obtains the captured images(s) 24 from the image sensor 22 shown in FIGS. 1A and 1B, and the current ambient lighting value indicative of the current ambient light condition 34 from the ALS 32 shown in FIGS. 1A and 1B. The usage data obtainer 220 provides the current ambient lighting value indicative of the current ambient light condition 34 to the ambient light analyzer 240, and the captured images 24 to the image modifier 250.

In some implementations, the enrollment images 214 are colored images, and the color matrix generator 230 generates a color matrix 232 based on the enrollment images 214. In some implementations, the color matrix 232 includes color information for the body part 14 shown in FIGS. 1A and 1B. For example, the color matrix 232 defines colors of different portions of the body part 14. As shown in FIG. 2, the color matrix generator 230 provides the color matrix 232 to the image modifier 250.

In some implementations, the ambient light analyzer 240 determines a difference 242 between the current ambient light condition 34 and the threshold ambient light condition 216. In some implementations, the difference 242 indicates whether the current ambient light level is brighter or darker than the threshold ambient light level detected during the enrollment phase. As shown in FIG. 2, the ambient light analyzer 240 provides the difference 242 to the image modifier 250.

In some implementations, the image modifier 250 generates the modified image(s) 28 by modifying the captured image(s) 24 based on the difference 242 between the current ambient light condition 34 and the threshold ambient light condition 216. In some implementations, the image modifier 250 generates the modified image(s) 28 by multiplying the captured image(s) 24 with the color matrix 232. Since the captured image(s) 24 lack color information, multiplying the captured image(s) 24 by the color matrix 232 results in colored modified image(s) 28.

In some implementations, the image modifier 250 generates a modified color matrix by adjusting the color matrix 232 based on the difference 242 between the current ambient light condition 34 and the threshold ambient light condition 216. In such implementations, the image modifier 250 generates the modified image(s) 28 by multiplying the captured image(s) 24 with the modified color matrix. In some implementations, the image modifier 250 adjusts the color matrix 232 by applying a scaling factor to the color matrix 232 based on the difference 242 between the current ambient light condition 34 and the threshold ambient light condition 216. For example, if the current ambient light value is less than the threshold ambient light value, the image modifier 250 dampens the values in the color matrix 232 by multiplying the values in the color matrix 232 by a number that is less than one. As another example, if the current ambient light value is greater than the threshold ambient light value, the image modifier 250 amplifies the values in the color matrix 232 by multiplying the values in the color matrix 232 by a number that is greater than one.

In some implementations, the image modifier 250 presents the modified image(s) 28 on the display 26 shown in FIGS. 1A and 1B. In some implementations, the image presentation engine 200 generates and presents the modified image(s) 28 when the person 40 (shown in FIG. 1A) is within a threshold distance of the electronic device 20. For example, the image presentation engine 200 generates the modified image(s) 28 when the person 40 is within 20 feet of the electronic device 20. In some implementations, the image presentation engine 200 forgoes generating and presenting the modified image(s) 28 when the person 40 (shown in FIG. 1A) is beyond the threshold distance of the electronic device 20. For example, the image presentation engine 200 forgoes generating and presenting the modified image(s) 28 when the person 40 is more than 20 feet from the electronic device 20 or when the person 40 is not in the physical environment 10 at all. Forgoing generation and presentation of the modified image(s) 28 when the person 40 is not near the electronic device 20 tends to conserve limited power resources of the electronic device 20 thereby extending a battery-life of the electronic device 20. In some implementations, the electronic device 20 includes a scene-facing proximity sensor that detects a distance between the person 40 and the electronic device 20, and the usage data obtainer 220 obtains the distance detected by the proximity sensor.

In some implementations, the usage data obtainer 220 obtains information that indicates whether or not the person 40 is gazing towards the electronic device 20. In some implementations, the image presentation engine 200 generates and presents the modified image(s) 28 in response to detecting that the person 40 is gazing towards the electronic device 20. Additionally, the image presentation engine 200 forgoes generation and presentation of the modified image(s) 28 in response to detecting that the person 40 is not gazing towards the electronic device 20. As such, when the person 40 is not gazing towards the electronic device 20, the electronic device 20 conserves its limited power resources by forgoing generation and presentation of the modified image(s) 28 on the display 26.

In some implementations, the image presentation engine 200 generates the modified image(s) 28 such that a visual appearance of the body part 14 depicted in the modified image(s) 28 matches a visual appearance of a portion of the user 12 that is not depicted in the modified image(s) 28 and is directly viewable. For example, a brightness of a nose bridge depicted in the modified image(s) 28 matches a brightness of cheeks that are not depicted in the modified image(s) 28 and are directly viewable.

In some implementations, the image presentation engine 200 (e.g., the enrollment data obtainer 210) performs a filtering operation on the enrollment image(s) 214 in order to remove undesirable artifacts from the enrollment image(s) 214. For example, in some implementations, the enrollment data obtainer 210 removes shadows, reflections and/or illumination effects from the enrollment image(s) 214. In some implementations, removing undesirable artifacts (e.g., shadows, reflections and/or illumination effects) from the enrollment image(s) 214 reduces an amount of computing resources that is associated with generating the modified image(s) 28. For example, removing shadows, reflections and/or illumination effects from the enrollment image(s) 214 reduces an amount of time and/or an amount of computing resources for modifying the captured image(s) 24 based on the current ambient light condition 34.

In some implementations, the image presentation engine 200 resides at a tablet or a smartphone with a front-facing display and a rear-facing camera. In such implementations, the image presentation engine 200 can obtain images of a body part (e.g., an arm) captured by the rear-facing camera and display modified versions of the images on the front-facing display. The modified versions of the images can include AR tattoos or stickers overlaid on the image of the arm. In various implementations, the image presentation engine 200 can obtain images of other body parts such as the chest, shoulders, legs, neck, head, eyes, nose, ears and the like, and display modified versions of the images of the other body parts. Referring back to FIG. 1A, if the electronic device 20 is an HMD and the user 12 and the person 40 are having a conversation while the user 12 is wearing the HMD, the person 40 may not be able to view the eyes of the user 12. However, the image sensor 22 captures images of the eyes of the user 12, and displaying images of the eyes on the display 26 provides an appearance that the eyes of the user 12 are visible and not being obscured by the electronic device 20. In such implementations, the electronic device 20 is worn around the head of the user 12, and the body part 14 includes a portion of a face of the user 12. Since the image sensor 22 faces the user 12, the image sensor 22 can be referred to as a user-facing camera. In some implementations, the image sensor 22 includes an infrared (IR) camera that captures IR images of the body part 14.

Figure 3:
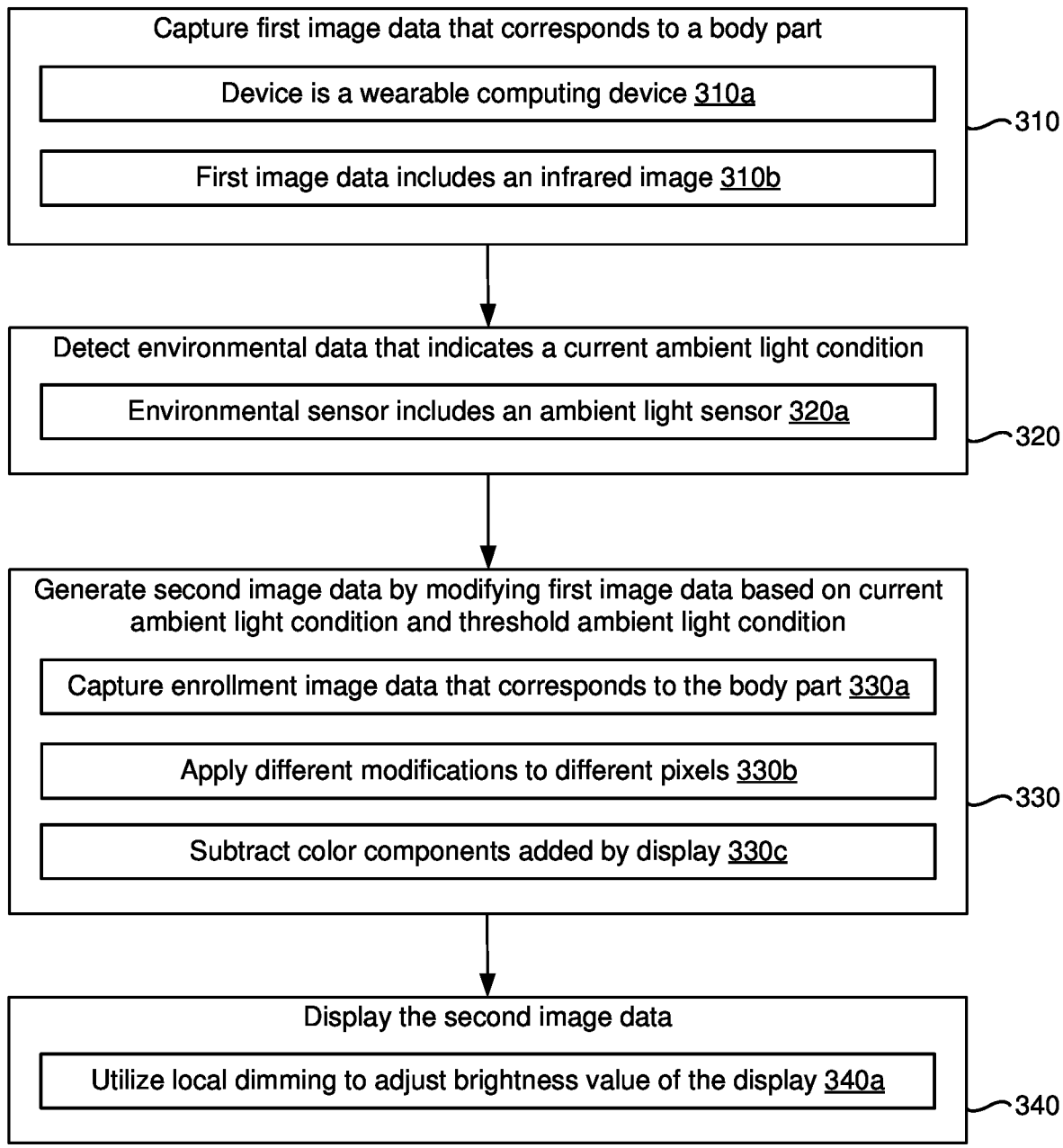
FIG. 3 is a flowchart representation of a method of displaying image data based on ambient light in accordance with some implementations.

FIG. 3 is a flowchart representation of a method 300 for displaying image data based on ambient light. In various implementations, the method 300 is performed by a device (e.g., the electronic device 20 shown in FIG. 1A and/or the image presentation engine 200 shown in FIGS. 1B and 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes capturing, via the image sensor, first image data that corresponds to a body part of a user of the device. For example, as shown in FIGS. 1A and 1B, the image sensor 22 captures the image(s) 24 that depict the body part 14 of the user 12. As described herein, in some implementations, the body part includes a portion of the user's chest, shoulder, leg, neck, head, eyes, nose, ears, and the like, and the first image data includes images of that specific body part captured by a user-facing camera.

As represented by block 310a, in some implementations, the device includes a wearable computing device, and the first image data is captured while the user is wearing the wearable computing device. In some implementations, the device is a smart phone, and the first image data is an image of a part of an arm of the user. For example, the first image data includes images that depict at least a portion of one of the user's wrist, hands, shoulders, forearms, biceps, and triceps. As discussed herein, embodiments are not limited to smart phones that capture images of an arm, but can include other devices such as an HMD, where the first image data is an image of a face of a user wearing the HMD. In such instances, the first image data includes images that depict the user's eyes, nose bridge, a portion of the user's forehead and/or a portion of the user's cheeks.

As represented by block 310b, in some implementations, the image sensor includes an infrared image sensor and the first image data includes an infrared image that indicates a heat signature and does not indicate a color of the body part. Some IR image sensors utilize less power than visible light image sensors. As such, using an IR image sensor to capture images of the body part extends a battery life of the electronic device and allows the user to use the electronic device for a longer time duration. As described herein, in some implementations, the image sensor 22 shown in FIG. 1A is an infrared image sensor, and the image(s) 24 shown in FIG. 1B lack color information.

As represented by block 320, in some implementations, the method 300 includes detecting, via the environmental sensor, environmental data that indicates a current ambient light condition of a physical environment surrounding the device. As represented by block 320a, in some implementations, the environmental sensor includes an ambient light sensor. For example, as shown in FIGS. 1A and 1B, the ALS 32 captures a current ambient light value that indicates the current ambient light condition 34 of the physical environment 10.

As represented by block 330, in some implementations, the method 300 includes generating second image data by modifying the first image data based on a function of the current ambient light condition and a threshold ambient light condition detected during enrollment. For example, as shown in FIG. 1B, the image presentation engine 200 generates the modified image(s) 28 by modifying the captured image(s) 24 based on a difference between the current ambient light condition 34 and the threshold ambient light condition 216.

As represented by block 330a, in some implementations, the method 300 includes prior to capturing the first image data, capturing enrollment image data that corresponds to the body part and detecting the threshold ambient light condition while capturing the enrollment image data. For example, as shown in FIG. 2, the enrollment data obtainer 210 obtains the enrollment data 212 that includes the enrollment image(s) 214 and a value that indicates the threshold ambient light condition 216.

In some implementations, the device includes a wearable computing device, and the enrollment image data is captured while the user is not wearing the wearable computing device. For example, in some implementations, the user uses another device to capture the enrollment images. In some implementations, the electronic device prompts the user to capture the enrollment images during an initial setup of the electronic device. In some implementations, obtaining the enrollment images includes prompting the user to move the body part and capturing images of the body part from different viewing angles. For example, obtaining the enrollment images includes prompting the user to move his arm and capturing images of the user's arm from different viewing angles. In some implementations, obtaining the enrollment images includes prompting the user to rotate his/her head and capturing images of the user's face from different viewing angles.

In some implementations, the first image data does not indicate a color of the body part and the enrollment image data indicates the color of the body part, and generating the second image data comprises modifying the first image data based on the color indicated by the enrollment image data. For example, as described in relation to FIG. 2, in some implementations, the image modifier 250 modifies the captured image(s) 24 by incorporating color information indicated by the color matrix 232 into the captured image(s) 24. In some implementations, the enrollment images are captured using a visible light camera that may use more power than an IR camera. Since the enrollment images are captured once, using a higher-powered visible light camera that captures colored images does not have an adverse impact on a battery life of the electronic device. By contrast, the first image data may be captured periodically (e.g., continuously) and using a lower-powered IR camera that does not capture color information conserves a significant amount of battery power and allows the user to use the electronic device for a longer time duration.

In some implementations, the method 300 includes generating, based on the enrollment image data, a color matrix that defines colors of the body part. For example, as shown in FIG. 2, the color matrix generator 230 generates the color matrix 232 based on the enrollment image(s) 214. As described in relation to FIG. 2, the color matrix 232 indicates colors of the body part 14 shown in FIG. 1A. In some implementations, the method 300 includes generating a modified color matrix by modifying the color matrix based on a difference between the current ambient light condition and the threshold ambient light condition. For example, as described in relation to FIG. 2, the image modifier 250 adjusts the color matrix 232 based on the difference 242 between the current ambient light condition 34 and the threshold ambient light condition 216. For example, the image modifier 250 adjusts the color matrix 232 by multiplying values in the color matrix with a scaling factor that is a function of the difference 242. In some implementations, the method 300 includes generating the second image data by multiplying the first image data with the modified color matrix. For example, as described in relation to FIG. 2, the image modifier 250 generates the modified image(s) 28 by multiplying the captured image(s) 24 with the color matrix 232.

As represented by block 330b, in some implementations, modifying the first image data includes applying a first modification to a first set of pixels in the first image data that corresponds to a first portion of the body part and applying a second modification to a second set of pixels in the first image data that corresponds to a second portion of the body part. In some implementations, the body part includes an arm of the user, the first portion of the body part includes a forearm and the second portion of the body part includes a wrist, and pixels corresponding to the wrist are modified to a lesser degree than pixels corresponding to the forearm. In some implementations, the body part includes a face of the user, the first portion of the body part includes eyes of the user and the second portion of the body part includes a portion of a forehead of the user. As an example, in some implementations, pixels corresponding to the user's eyes are modified to a lesser degree than pixels corresponding to the user's forehead.

As represented by block 330c, the display includes an additive light display, and generating the second image data includes determining amounts of color components that one or more layers of the additive light display add while displaying the second image data, and subtracting the amounts of color components from the second image data. As an example, if the display 26 shown in FIG. 1A is expected to add a blue color component, the image modifier 250 subtracts a portion of the blue color component from the color matrix 232 such that the modified image(s) 28 include the blue color component to a lesser degree. Subtracting amounts of color components from the second image data allows the electronic device to compensate for color components that the display is expected to add.

As represented by block 340, in some implementations, the method 300 includes displaying the second image data on the display. For example, as shown in FIG. 1B, the display 26 displays the modified image(s) 28. As represented by block 340a, in some implementations, the display includes an additive light display and displaying the second image data includes utilizing local dimming to adjust a brightness value of a portion of the display that displays the second image data corresponding to the body part. Using local dimming allows the electronic device to present the second image data such that a visual appearance of the body part being displayed on the display matches a visual appearance of another body part that is directly viewable. For example, a brightness of the user's eyes, nose bridge and forehead viewable through the display match a brightness of the user's cheeks and chin that are directly viewable.

Figure 4:
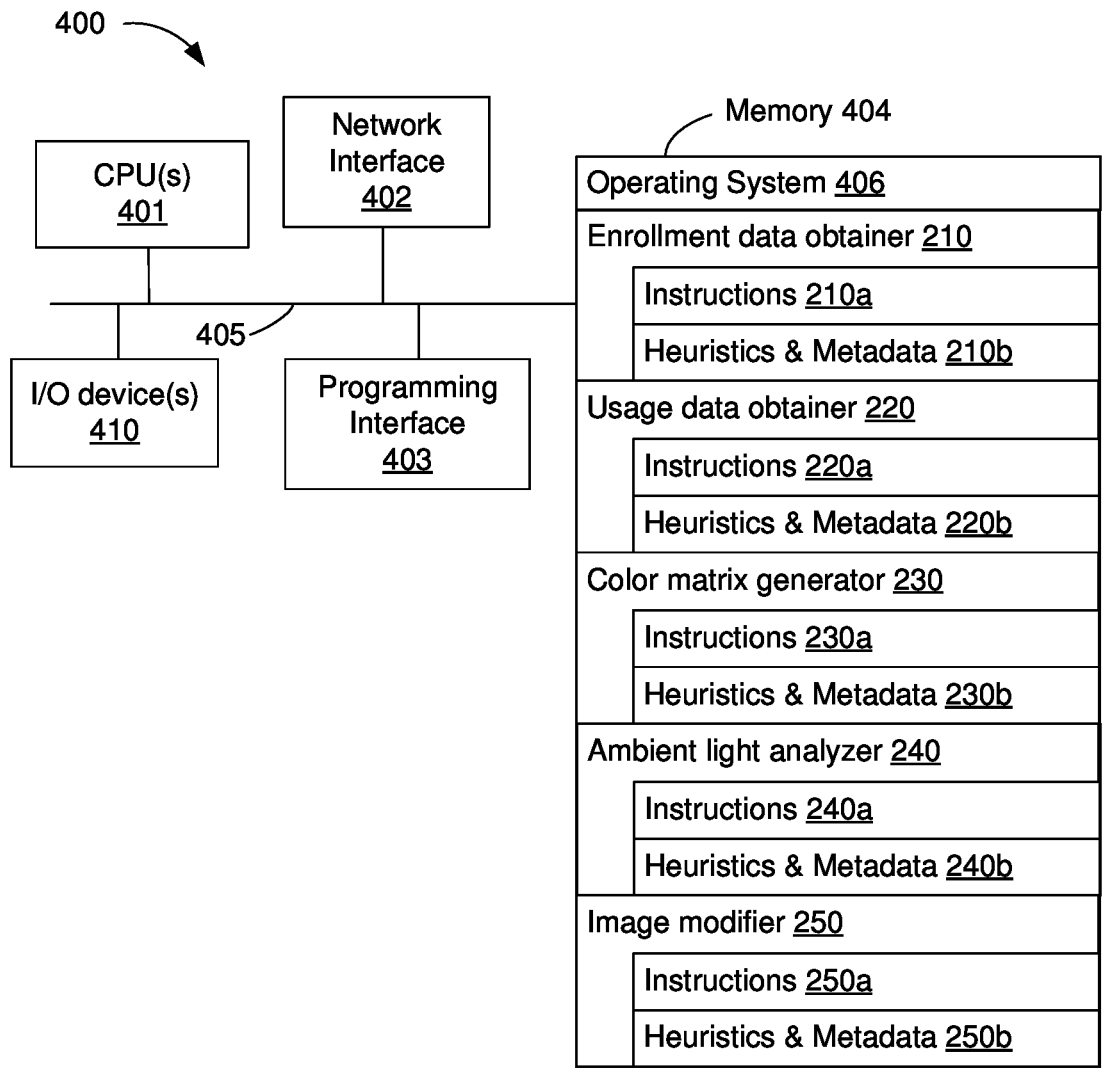
FIG. 4 is a block diagram of a device that displays image data based on ambient light in accordance with some implementations.

FIG. 4 is a block diagram of a device 400 in accordance with some implementations. In some implementations, the device 400 implements the electronic device 20 shown in FIG. 1A and/or the image presentation engine 200 shown in FIGS. 1B and 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the enrollment data obtainer 210, the usage data obtainer 220, the color matrix generator 230, the ambient light analyzer 240 and the image modifier 250. In various implementations, the device 400 performs the method 300 shown in FIG. 3.

In some implementations, the enrollment data obtainer 210 includes instructions 210a, and heuristics and metadata 210b for obtaining (e.g., receiving and/or capturing) the enrollment data 212 shown in FIG. 2. In some implementations, the enrollment data obtainer 210 performs at least some of the operation(s) represented by block 330a in FIG. 3.

In some implementations, the usage data obtainer 220 includes instructions 220a, and heuristics and metadata 220b for obtaining the images 24 and a value indicating the current ambient light condition 34 shown in FIGS. 1B and 2. In some implementations, the usage data obtainer 220 performs at least some of the operation(s) represented by blocks 310 and 320 in FIG. 3.

In some implementations, the color matrix generator 230 includes instructions 230a, and heuristics and metadata 230b for generating the color matrix 232 based on the enrollment image(s) 214 shown in FIG. 2. In some implementations, the color matrix generator 230 performs at least some of the operation(s) represented by block 330 in FIG. 3.

In some implementations, the ambient light analyzer 240 includes instructions 240a, and heuristics and metadata 240b for determining the difference 242 between the current ambient light condition 34 and the threshold ambient light condition 216 shown in FIG. 2. In some implementations, the ambient light analyzer 240 performs at least some of the operation(s) represented by block 330 in FIG. 3.

In some implementations, the image modifier 250 includes instructions 250a, and heuristics and metadata 250b for modifying the captured image(s) 24 based on the difference 242 between the current ambient light condition 34 and the threshold ambient light condition 216 shown in FIG. 2. In some implementations, the image modifier 250 performs at least some of the operation(s) represented by blocks 330 and 340 in FIG. 3.

In some implementations, the one or more I/O devices 410 include an input device for obtaining inputs (e.g., user inputs, images and/or environmental data). In some implementations, the one or more I/O devices 410 include a touchscreen, a depth sensor (e.g., a depth camera) and/or an image sensor (e.g., a camera, for example, a visible light camera or an infrared light camera such as the image sensor 22 shown in FIGS. 1A and 1B). In some implementations, the one or more I/O devices 410 include an environmental sensor such as an ambient light sensor (e.g., the ALS 32 shown in FIGS. 1A and 1B). In some implementations, the one or more I/O devices 410 include a display (e.g., the display 26 shown in FIG. 1A).

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
at a device including an image sensor, an environmental sensor, a display, a non-transitory memory and one or more processors coupled with the image sensor, the environmental sensor, the display and the non-transitory memory:
capturing, via the image sensor, first image data that corresponds to a first body part of a user of the device that is viewable through the display, wherein the first image data provides the first body part a first visual appearance that is different from a second visual appearance of a second body part that is not depicted in the first image data and is viewable without the display;
detecting, via the environmental sensor, environmental data that indicates a current ambient light condition of a physical environment surrounding the device;
generating second image data by modifying the first image data based on a function of the current ambient light condition and a threshold ambient light condition detected during enrollment, wherein the second image data provides the first body part the second visual appearance in order to match the second visual appearance of the second body part that is viewable without the display; and
displaying the second image data on the display.

2. The method of claim 1, further comprising:
prior to capturing the first image data, capturing enrollment image data that corresponds to the first body part and detecting the threshold ambient light condition while capturing the enrollment image data.

3. The method of claim 2, wherein the device includes a wearable computing device, and the enrollment image data is captured while the user is not wearing the wearable computing device.

4. The method of claim 2, wherein the first image data does not indicate a color of the first body part and the enrollment image data indicates the color of the first body part, and wherein generating the second image data comprises modifying the first image data based on the color indicated by the enrollment image data.

5. The method of claim 2, further comprising:
generating, based on the enrollment image data, a color matrix that defines colors of the first body part;
generating a modified color matrix by modifying the color matrix based on a difference between the current ambient light condition and the threshold ambient light condition; and
generating the second image data by multiplying the first image data with the modified color matrix.

6. The method of claim 1, wherein modifying the first image data comprises applying a first modification to a first set of pixels in the first image data that corresponds to a first portion of the first body part and applying a second modification to a second set of pixels in the first image data that corresponds to a second portion of the first body part.

7. The method of claim 6, wherein the first body part includes a face of the user, the first portion of the first body part includes eyes of the user and the second portion of the first body part includes a portion of a forehead of the user.

8. The method of claim 1, wherein the display includes an additive light display, and wherein generating the second image data comprises:
determining amounts of color components that one or more layers of the additive light display add while displaying the second image data; and
subtracting the amounts of color components from the second image data.

9. The method of claim 1, wherein the device includes a wearable computing device, and the first image data is captured while the user is wearing the wearable computing device.

10. The method of claim 1, wherein the image sensor includes an infrared image sensor and the first image data includes an infrared image that does not indicate a color of the first body part.

11. The method of claim 1, wherein the display includes an additive light display and displaying the second image data includes utilizing local dimming to adjust a brightness value of a portion of the display that is displaying the second image data corresponding to the first body part.

12. The method of claim 1, wherein the environmental sensor includes an ambient light sensor.

13. The method of claim 1, wherein the first visual appearance corresponds to a first brightness level and the second visual appearance corresponds to a second brightness level that is different from the first brightness level.

14. The method of claim 1, wherein the first visual appearance is associated with a first set of colors and the second visual appearance is associated with a second set of colors that is different from the first set of colors.

15. A device comprising:
one or more processors;
an image sensor;
an environmental sensor;
a display;
a non-transitory memory; and
one or more programs stored in the non-transitory memory, which, when executed by the one or more processors, cause the device to:
capture, via the image sensor, first image data that corresponds to a first body part of a user of the device that is viewable through the display, wherein the first image data provides the first body part a first visual appearance that is different from a second visual appearance of a second body part that is not depicted in the first image data and is viewable without the display;
detect, via the environmental sensor, environmental data that indicates a current ambient light condition of a physical environment surrounding the device;
generate second image data by modifying the first image data based on a function of the current ambient light condition and a threshold ambient light condition detected during enrollment, wherein the second image data provides the first body part the second visual appearance in order to match the second visual appearance of the second body part that is viewable without the display; and
display the second image data on the display.

16. The device of claim 15, wherein the one or more programs further cause the device to:
prior to capturing the first image data, capture enrollment image data that corresponds to the first body part and detect the threshold ambient light condition while capturing the enrollment image data.

17. The device of claim 16, wherein the device includes a wearable computing device, and the enrollment image data is captured while the user is not wearing the wearable computing device.

18. The device of claim 16, wherein the first image data does not indicate a color of the first body part and the enrollment image data indicates the color of the first body part, and wherein generating the second image data comprises modifying the first image data based on the color indicated by the enrollment image data.

19. The device of claim 16, wherein the one or more programs further cause the device to:
generate, based on the enrollment image data, a color matrix that defines colors of the first body part;
generate a modified color matrix by modifying the color matrix based on a difference between the current ambient light condition and the threshold ambient light condition; and
generate the second image data by multiplying the first image data with the modified color matrix.

20. The device of claim 15, wherein modifying the first image data comprises applying a first modification to a first set of pixels in the first image data that corresponds to a first portion of the first body part and applying a second modification to a second set of pixels in the first image data that corresponds to a second portion of the first body part.

21. The device of claim 20, wherein the first body part includes a face of the user, the first portion of the first body part includes eyes of the user and the second portion of the first body part includes a portion of a forehead of the user.

22. A non-transitory memory storing one or more programs, which, when executed by one or more processors of a device, cause the device to:
capture, via an image sensor, first image data that corresponds to a first body part of a user of the device that is viewable through the display, wherein the first image data provides the first body part a first visual appearance that is different from a second visual appearance of a second body part that is not depicted in the first image data and is viewable without the display;
detect, via an environmental sensor, environmental data that indicates a current ambient light condition of a physical environment surrounding the device;
generate second image data by modifying the first image data based on a function of the current ambient light condition and a threshold ambient light condition detected during enrollment, wherein the second image data provides the first body part the second visual appearance in order to match the second visual appearance of the second body part that is viewable without the display; and
display the second image data on a display.

23. The non-transitory memory of claim 22, wherein the one or more programs further cause the device to:
prior to capturing the first image data, capture enrollment image data that corresponds to the first body part and detect the threshold ambient light condition while capturing the enrollment image data.

24. The non-transitory memory of claim 22, wherein the first visual appearance corresponds to a first brightness level and the second visual appearance corresponds to a second brightness level that is different from the first brightness level.

25. The non-transitory memory of claim 22, wherein the first visual appearance is associated with a first set of colors and the second visual appearance is associated with a second set of colors that is different from the first set of colors.

* * * * *